(12) United States Patent
Mateo (10) Patent No.: US 7,481,654 B1
(45) Date of Patent: Jan. 27, 2009

(54) ARTISTS'S GRID VIEWING DEVICE AND METHOD OF USE

(76) Inventor: Louis Ylizarde Mateo, 2345 NE. 10th Ave., Portland, OR (US) 97212

( * ) Notice: Subject to any disclaimer, the term of this patent is extended or adjusted under 35 U.S.C. 154(b) by 600 days.

(21) Appl. No.: 11/192,644

(22) Filed: Jul. 28, 2005

(51) Int. Cl.
*G09B 11/00* (2006.01)

(52) U.S. Cl. ........................................... 434/91

(58) Field of Classification Search ............... 434/81, 434/84, 85, 88, 90, 91, 92
See application file for complete search history.

(56) References Cited

U.S. PATENT DOCUMENTS

| | | | | | |
|---|---|---|---|---|---|
| 761,033 | A | * | 5/1904 | Cross | 33/283 |
| 1,992,083 | A | * | 2/1935 | McDonald | 434/90 |
| 2,263,101 | A | * | 11/1941 | Perry | 33/277 |
| 2,410,447 | A | * | 11/1946 | Juran | 434/91 |
| 2,487,690 | A | * | 11/1949 | Black et al. | 434/90 |
| 3,086,296 | A | * | 4/1963 | Bergstrom | 434/90 |
| 3,660,903 | A | * | 5/1972 | Caperton, Jr. | 33/276 |
| 3,834,043 | A | * | 9/1974 | Summers | 434/90 |
| 3,844,049 | A | * | 10/1974 | Suvada | 33/262 |
| 4,837,954 | A | * | 6/1989 | Shultz | 40/792 |
| 4,865,547 | A | * | 9/1989 | Glover | 434/85 |
| 5,015,084 | A | * | 5/1991 | Kryder | 359/872 |
| 5,580,250 | A | * | 12/1996 | McKewen | 434/91 |

* cited by examiner

*Primary Examiner*—Kurt Fernstrom
(74) *Attorney, Agent, or Firm*—Mark S. Hubert (57) ABSTRACT

The present invention is a handheld artist's aid designed to allow a freehand artist to establish horizontal fidelity, proportionality, subject scale, subject placement and angular relationships of a three-dimensional subject that is to become a two-dimensional work. It incorporates a visual leveling device in addition to a series of reference grids imposed there on. It is not designed as a copying or reproduction tool, but rather as an artist's aid that allows the artist freedom of expression yet frames the work within the physical reality of the structure. It is designed with multiple sized grids such that its use, can be enabled within the arms length of any artist.

9 Claims, 13 Drawing Sheets

ARTISTS'S GRID VIEWING DEVICE AND METHOD OF USE

BACKGROUND OF THE INVENTION

The present invention relates to an extremely compact device used to help artist's in drawing and painting (the "gridvu") and more particularly, to a hand positionable, transparent, clear viewing pane with a horizontal level and numerous visual grids superimposed thereon.

In the world of painting, drawing, and technical illustration, understanding the key visual issues is essential to the process of interpreting three-dimensional subject matter. There are five main elements necessary for the rendition of visually correct work. They are fidelity level, proportionality, scale, placement and thrust. Although artistic interpretation varies, the aesthetic value of any work is based on a high degree of accuracy with respect to all the five aforementioned elements. While the ability to correctly interpret what one sees in three dimensions and translate that into a visually aesthetic work on a two-dimension media is a learned skill, this can be simplified and heightened with the use of the gridvu. Thus, the grid view is an ideal instructional tool for beginning artists, as well as a handy reference guide for intermediate and advanced artists.

The earliest tool and still currently in use is a plumb bob with a length of string held in front of the model. For figure work, a tool such as a pencil is used, by sighting and using the head as a measuring unit. While sighting the head with the thumb and pencil, the artist counts the number of heads in the pose. The weakness of this method is the difficulty of accurately positioning the measuring unit as the artist moves the pencil down to make the headcount. With the gridvu only one viewing needs to be made since the artist can simply note the length of the pose at precisely the moment the device is held in front of the subject. A diagonal line with a skull icon serves as a measuring unit to determine the length of a figure in a variety of poses. The head length bar is used by matching the skull icon with the model's head thereby using the head as a yardstick to determine the length of the pose. Another diagonal line is also calibrated to serve as a visual yardstick for variety of applications. The grid system makes it easier to match the ratio of the canvas or drawing surface, to the composition of the subject.

An accurate drawing interpretation is achieved by knowing where lines or shapes are placed on a sheet of paper or other working surface. The grid structure on the gridvu provides various reference points to locate lines or shapes. Directions and shape length are easier to determine because the grid lines can show distance and size relationships between shapes. The gridvu is based on the square which is the simplest form to use for reducing or enlarging shapes without compromising proportional relationships. The gridvu has a simple centering feature, so that the artist can make a quick notation of which part of the subject belongs to which portion of the picture space.

The prior art in this field hereto for has focused on drawing aides for the exact replication, scaling or pixel copying of the subject matter. The gridvu focuses on allowing the artist freedom of expression of their interpretation of the subject matter while remaining within the proper parameters of the subject's fidelity level, proportionality, scale, placement and thrust. With additional masking of the relevant portions of the gridvu, it can also be utilized to "frame" a subject to the canvas or drawing surface (format) proportions. The physical size of the gridvu has been selected so as to allow the artist to reference both distance work, such as landscapes, and close work, such as portraits, within the placement range of normal human arm lengths.

Henceforth, the gridvu would fulfill a long felt need in the world of art. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide an artist's aid that is able to help artists to correctly visualize the three dimensional subject with respect to the horizontal plane, it's scale to the working format, it's relative proportions, as well as establish the location on the working surface and the angles of the subject's constituent members, and additionally allow the artist to frame the subject to the working surface's dimensions.

It has many of the advantages mentioned heretofore and many novel features that result in a new artist's grid which is not anticipated, rendered obvious, suggested, or even implied by any of the prior art, either alone or in any combination thereof.

In accordance with the invention, an object of the present invention is to provide an improved drawing aid that can be utilized by artist's to draw anything from close up portraits, distance landscapes and murals.

It is another object of this invention to provide a compact, inexpensive drawing aid that is capable of helping an artist correctly frame the horizontal component of the subject matter.

It is a further object of this invention to provide a drawing aid that is capable of helping the artist correctly proportion and locate the subject matter on the working surface.

It is still a further object of this invention to provide for a drawing aid that is capable of helping the artist correctly visualize the angles and relative sizes of the constituent members of the subject matter.

It is yet a further object of this invention to provide a durable, long life drawing aid that can be fabricated cheaply and simply.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 1:
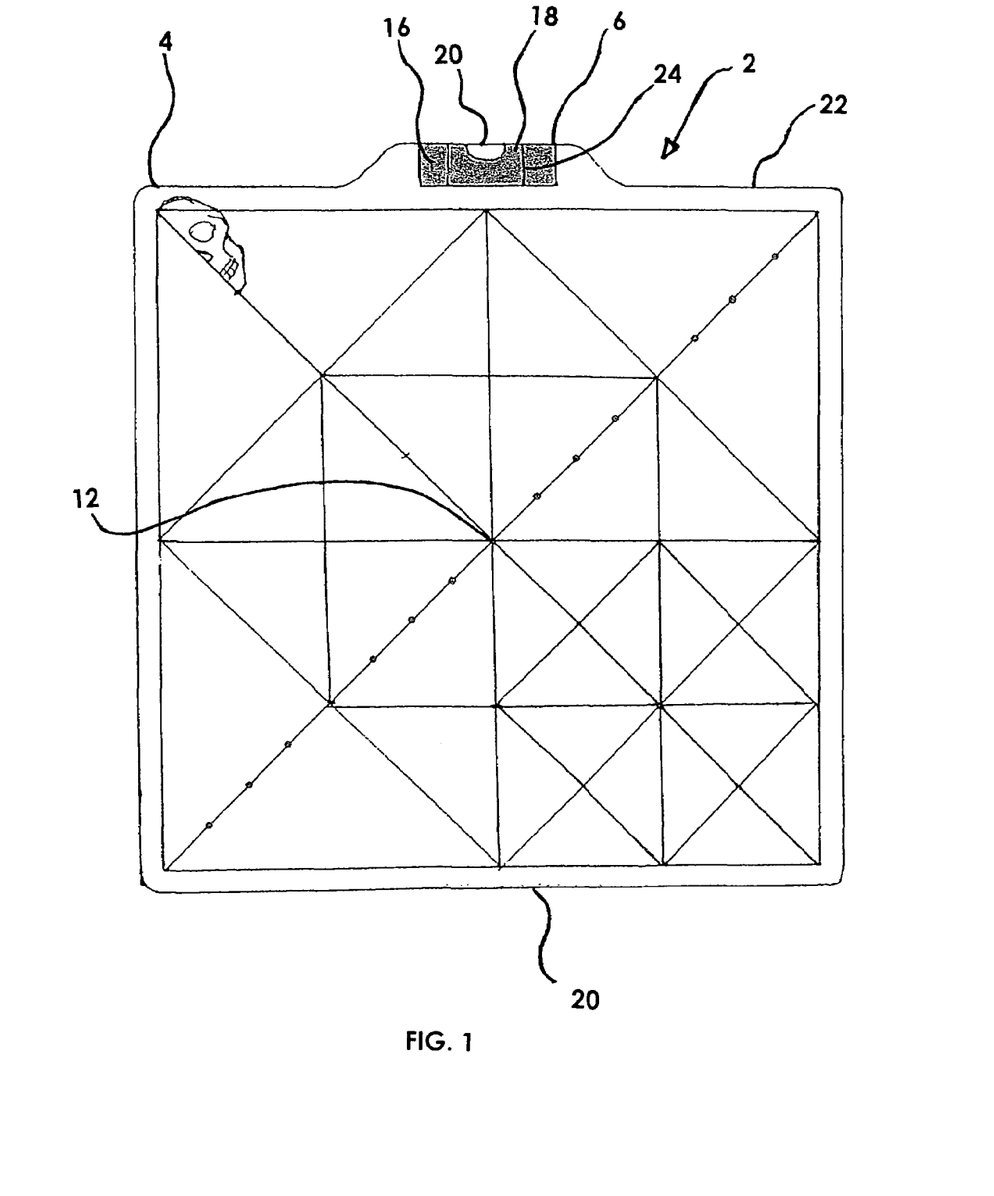
FIG. 1 is a front view of the gridvu showing the general arrangement of the level and of all scales.
Figure 2:
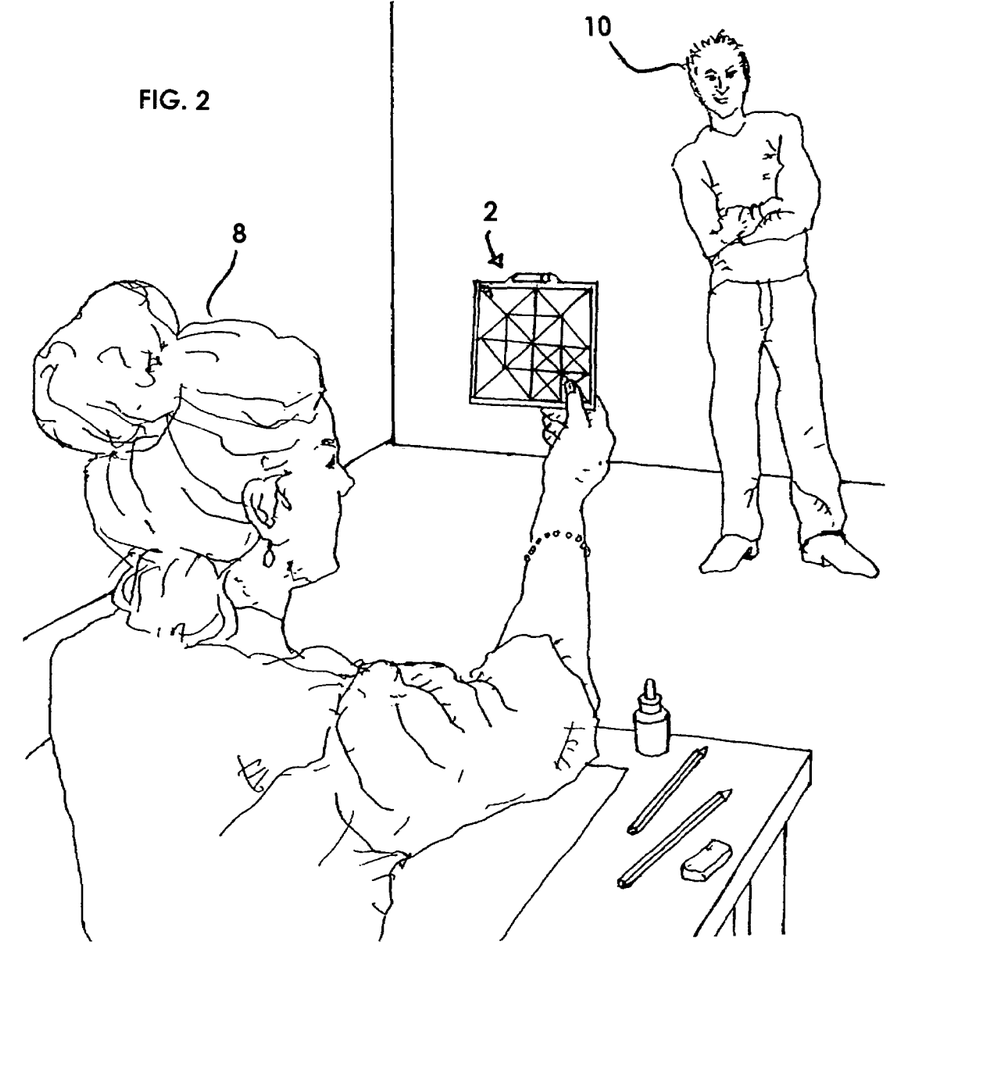
FIG. 2 is a perspective view of the gridvu as used by an artist.

Referring to FIG. 1 it can be seen that the preferred embodiment of the present invention is provided in an artist's grid viewing device 2 (the gridvu) that is a square transparent frame 4 that has several straight linear scales superimposed thereon. The frame may be constructed out of glass, plastic, or similar transparent polymer material. The requirements of the frame are that they be durable, scratch resistant, lightweight and inexpensive. On the top of the frame, preferably imbedded therein, resides is a visual level device 6. The level 6 in the preferred embodiment is commonly referred to as a "bubble" level. It is made of an enclosed cylindrical or other shaped cavity 16 that has a longitudinal axis parallel to the edges of two opposing sides of the device 20 and 22. The cavity 16 is partially filled with a colored fluid 18 so as to leave an air filled void 20 therein. There are two lines 24 about the cavity 16 that indicates "horizontal level" when the air bubble lies there between. The scales (grids) are superimposed upon the frame 4 by printing, however, chemical or laser etching, painting, abrasive scribing, adhesive pin striping or any combination thereof would be suitable methods of superimposing such grid lines. The preferred embodiment of the invention is approximately 5 inches by 5 inches with a raised protuberance on the top side for the level 6. This has been shown to correspond best to the viewing frame of reference within the normal person's arm length although it may be dimensionally sized differently. The thickness of the device 2 ranges between ⅛ inch and ½ inch with the preferred embodiment being approximately ⅛ inch thick. The level 6 may be incorporated into the actual frame material by boring cavity 16 into the top or bottom region of the frame outside the visual region of the outline box 36, or it may be mechanically or chemically attached to the top or bottom side. Referring to FIG. 2 the artist's grid viewing device 2 can be seen in operation. Use of the artist's grid viewing device 2 enables the artist 8 to correctly visualize and frame the subject 10 with respect to the horizontal plane (horizontal fidelity), the subject's size in relation to the working surface (format) size (scale), the subject's relative proportions (proportionality), as well as establish the subject's location on the format (location) and the angles of the subject's constituent members (thrust). The artist 8 views the subject 10 through the handheld device 2, adjusting the focal distance between the device and the artist's eyes within the extent of the artist's arm until the desired scale or grid line is appropriately aligned with the subject 10 to allow the artist 8 to accomplish one of the five aforementioned functions. Each of these functions, and the recommended sequencing thereof, will be further discussed in relation to FIGS. 8-12.

Figure 3:
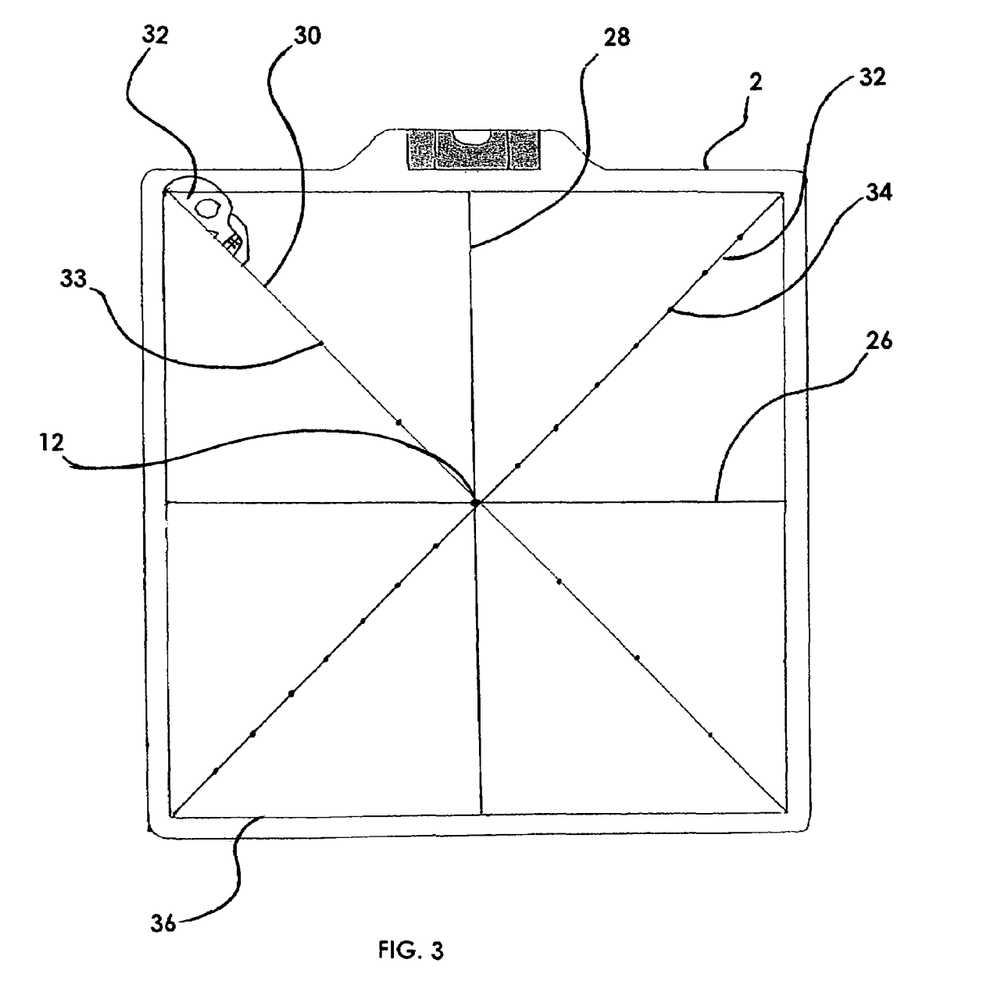
FIG. 3 is a front view of the gridvu with all scales removed except the primary reference grid.
Figure 4:
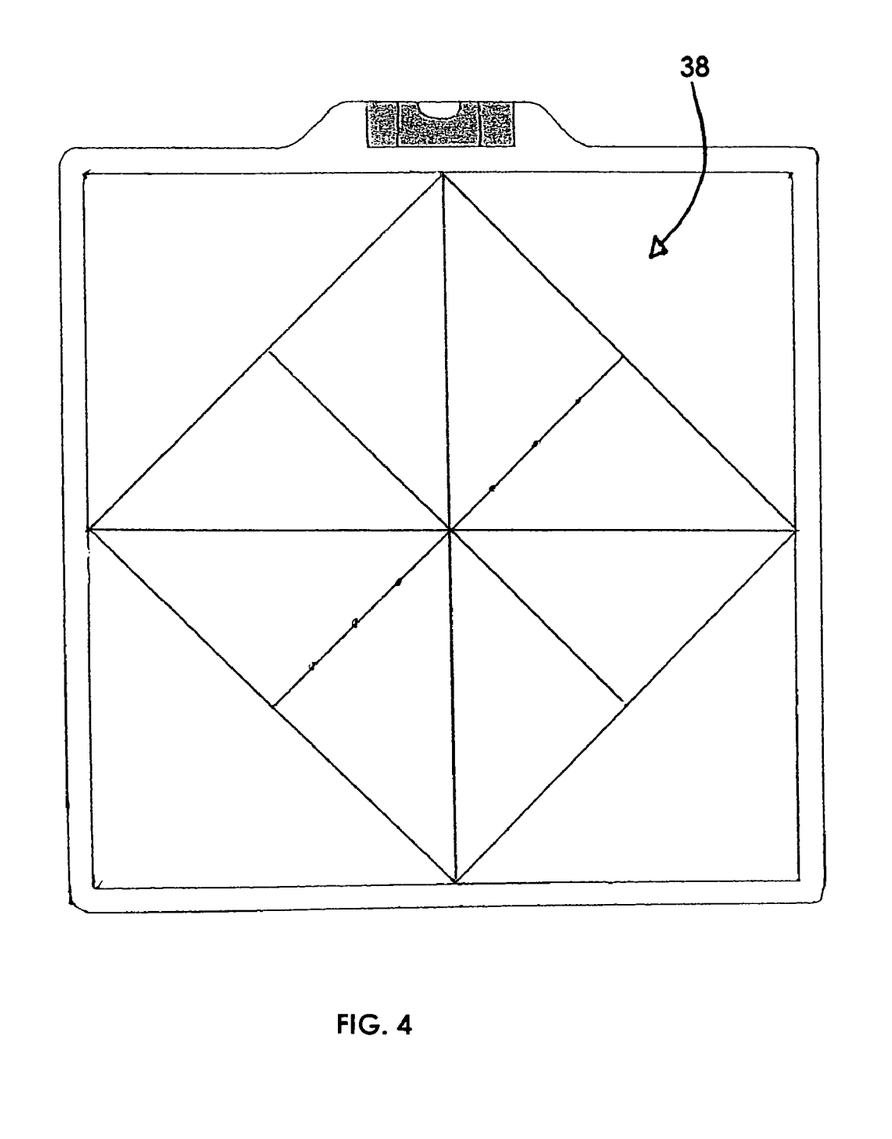
FIG. 4 is a front view of the gridvu with all scales removed except the secondary reference grid.
Figure 5:
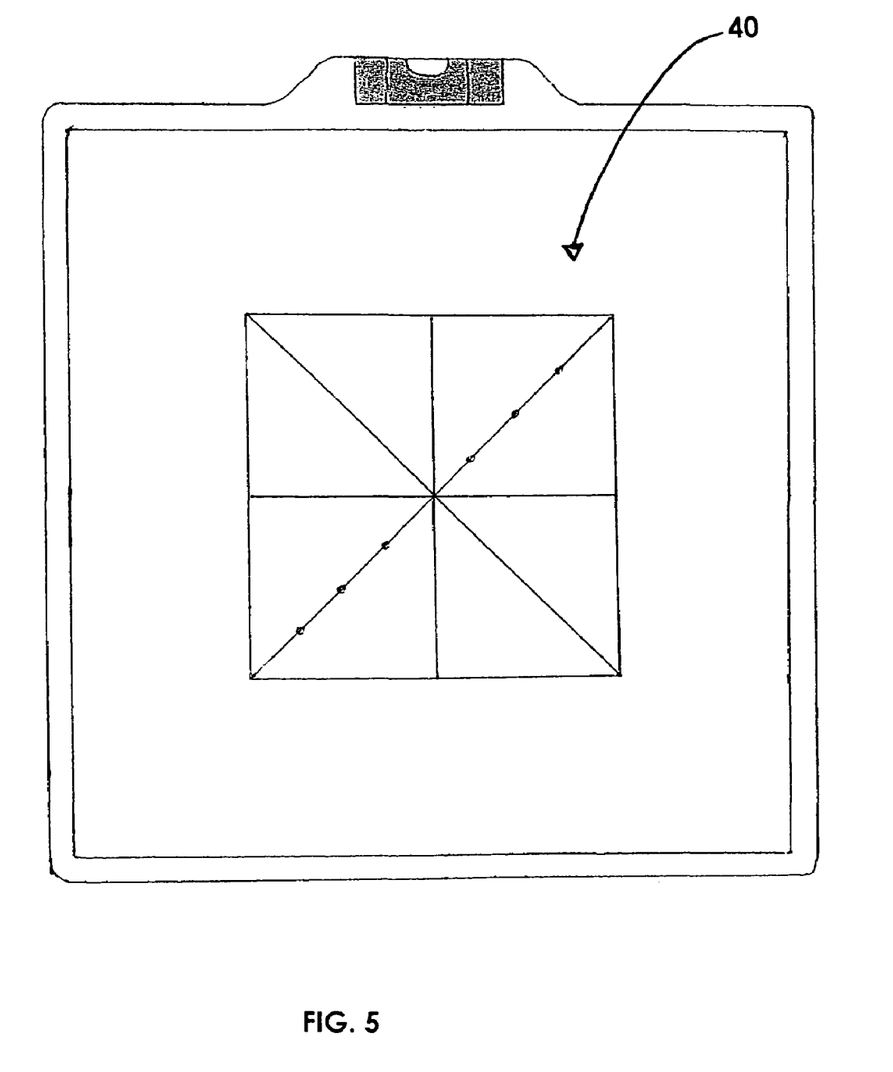
FIG. 5 is a front view of the gridvu with all scales removed except the tertiary reference grid.
Figure 6:
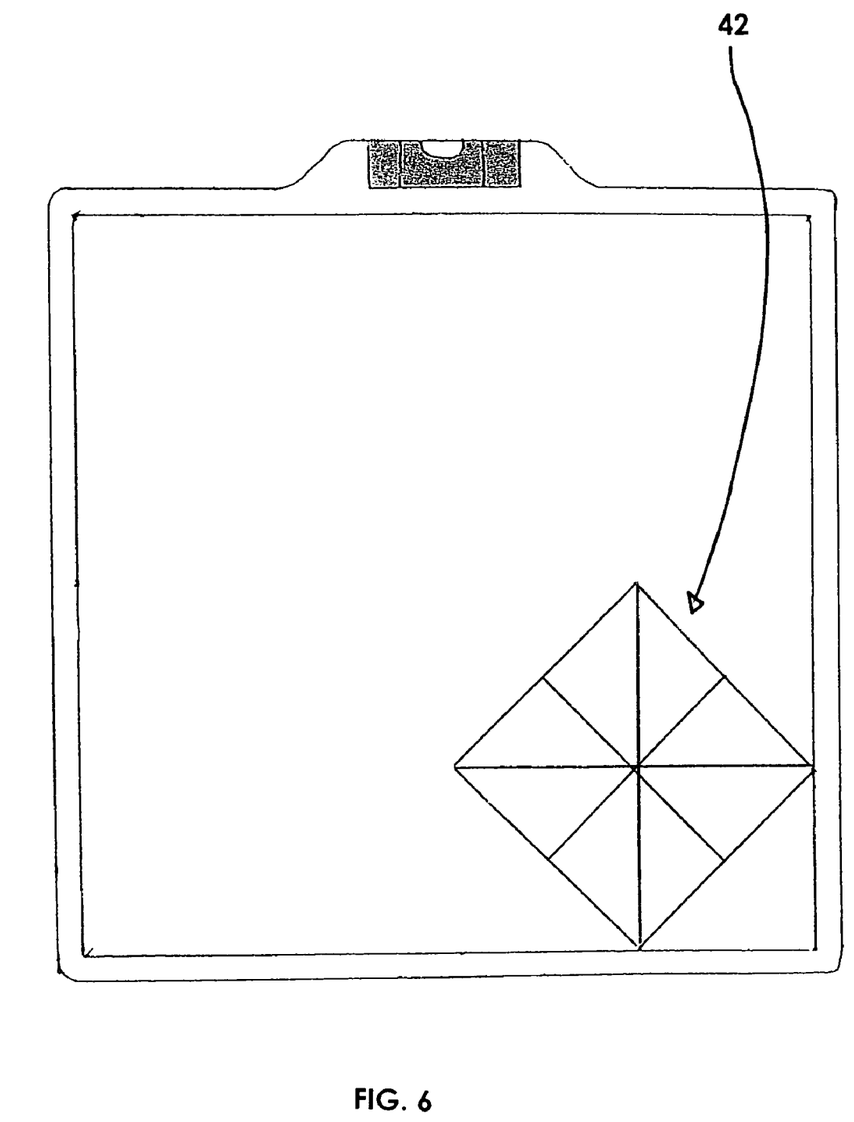
FIG. 6 is a front view of the gridvu with all scales removed except the quaternary reference grid.
Figure 7:
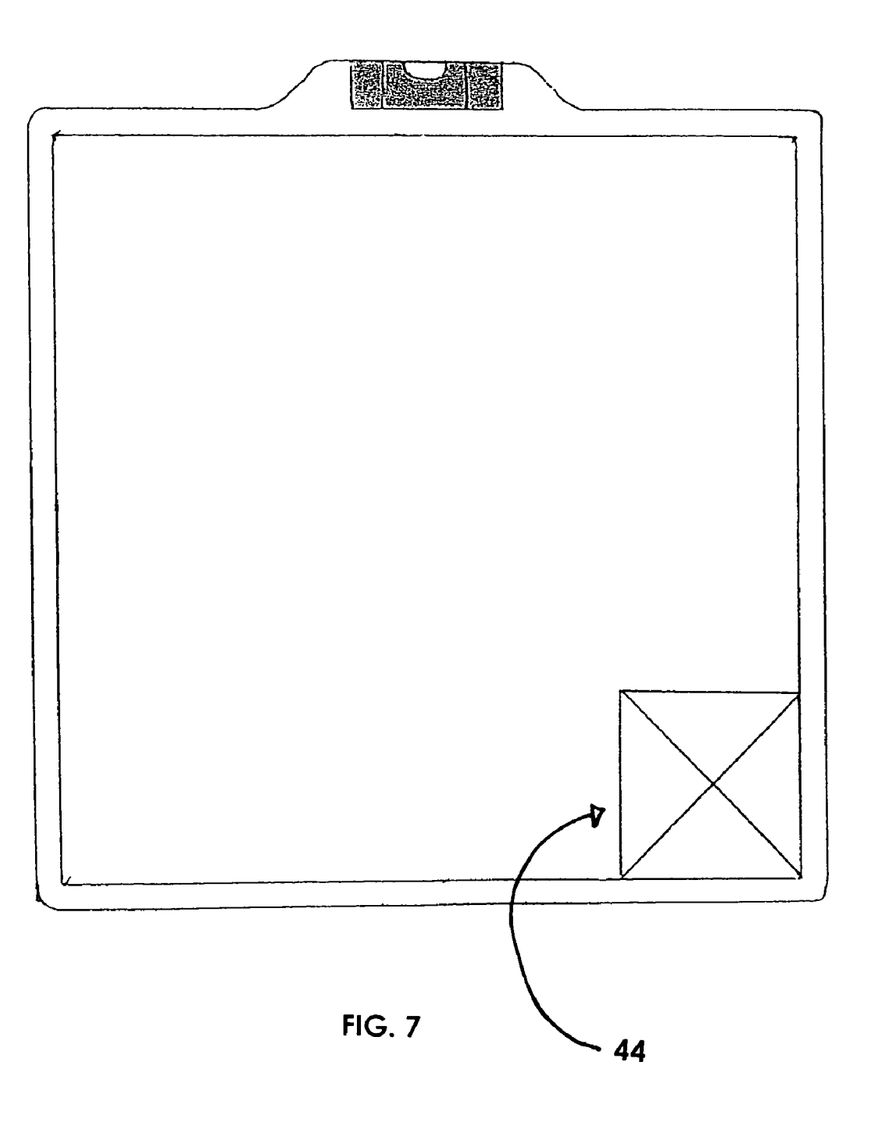
FIG. 7 is a front view of the gridvu with all scales removed except the quinary reference guide.
Figure 8:
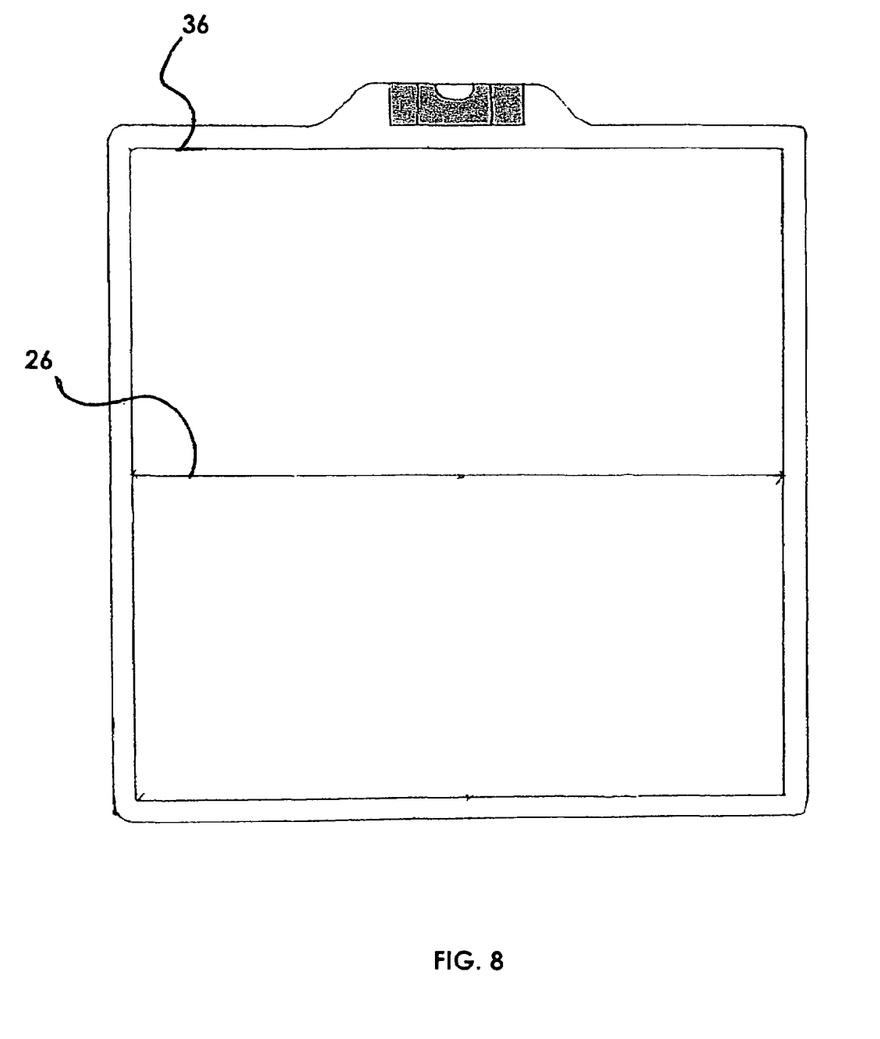
FIG. 8 is a front view of the gridvu with all scales removed except the fidelity level gridlines.
Figure 9:
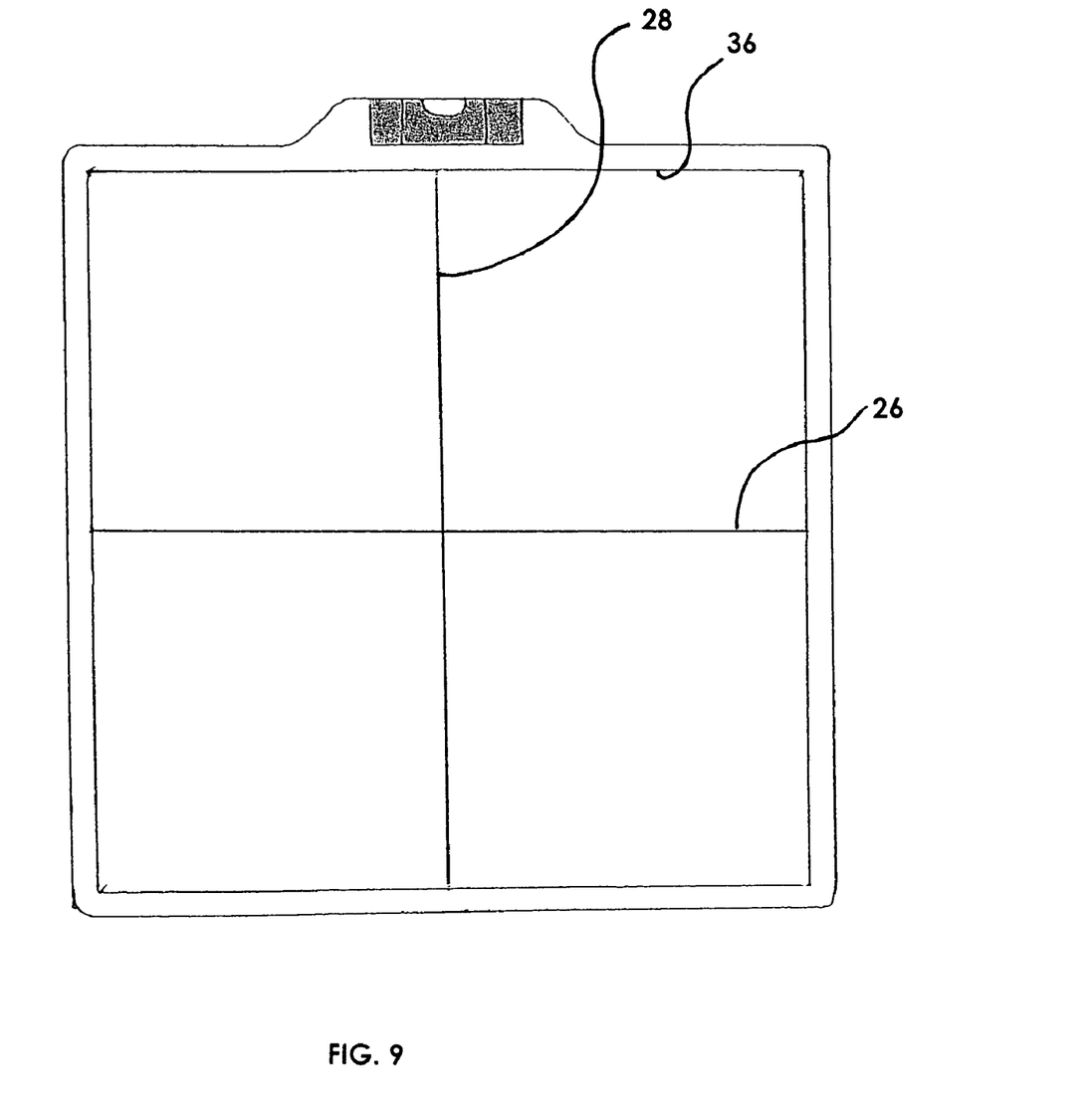
FIG. 9 is a front view of the gridvu with all scales removed except the general scale gridlines of the primary reference grid.
Figure 10:
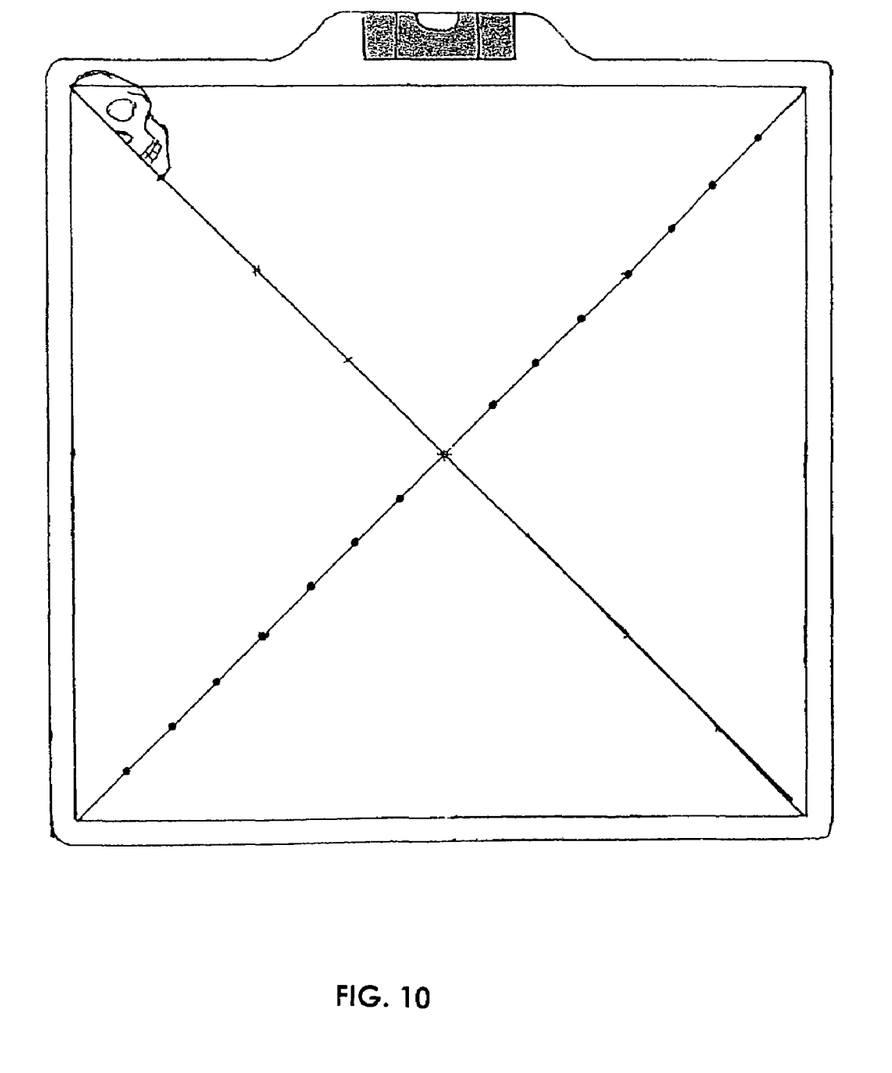
FIG. 10 is a front view of the gridvu with all scales removed except the first and second proportionality gridlines of the primary reference grid.
Figure 11:
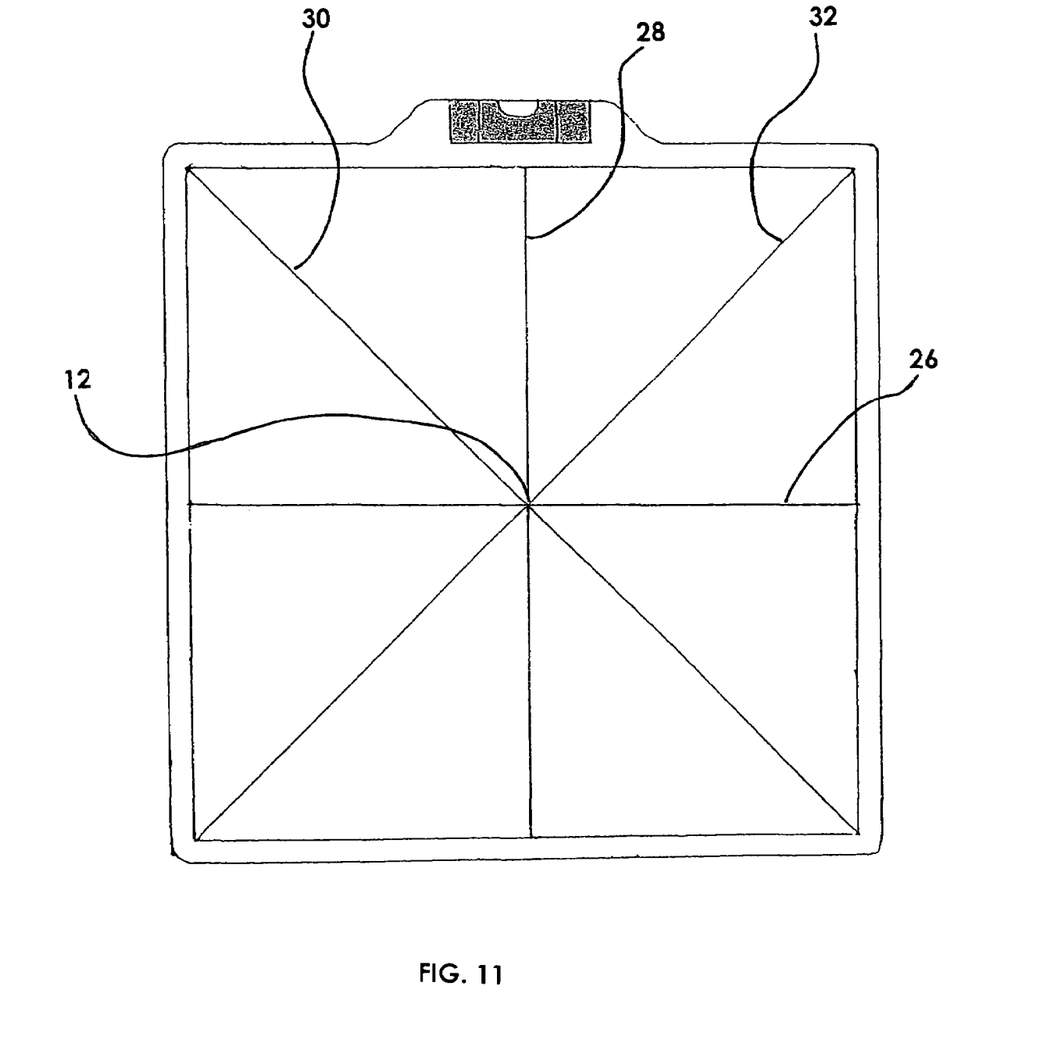
FIG. 11 is a front view of the gridvu with all scales removed except the placement gridlines of the primary reference grid.
Figure 12:
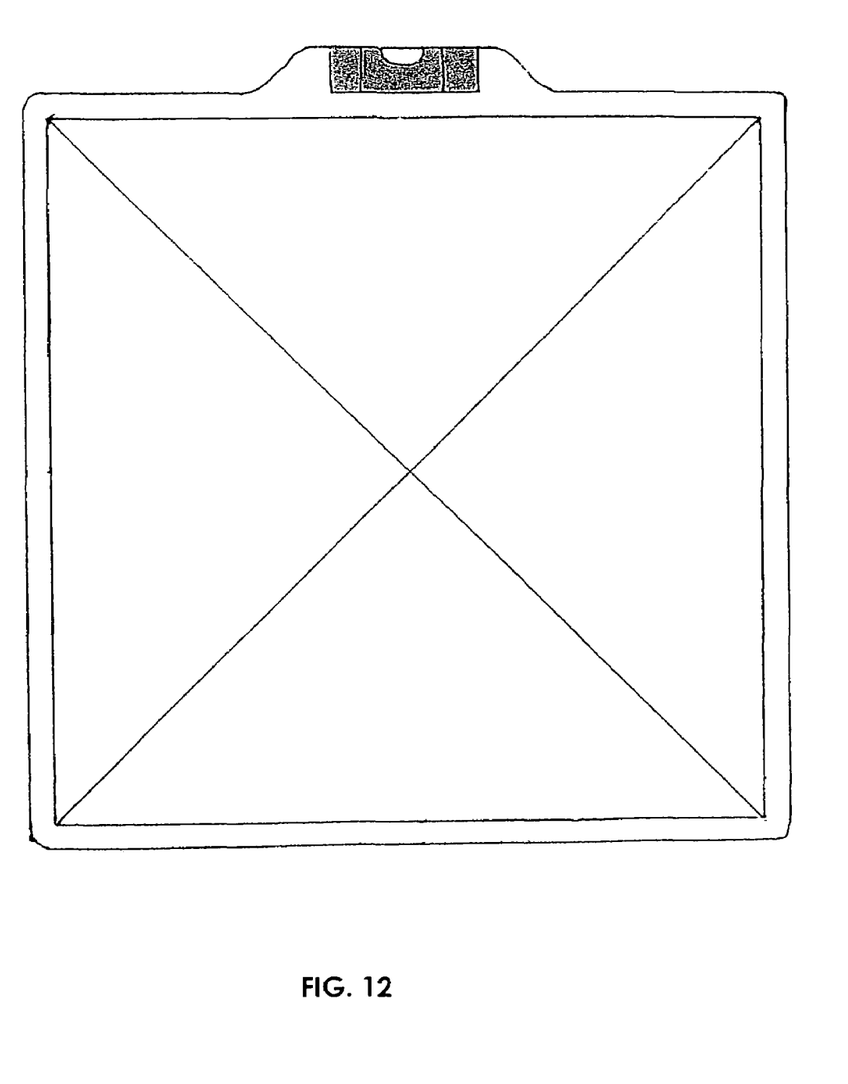
FIG. 12 is a front view of the gridvu with all scales removed except the thrust gridlines.

FIG. 3 illustrates the artist's grid viewing device 2 with only the primary reference grid thereon. The primary reference grid includes an outline box 36, a center point 12, a horizontal reference line 26, a vertical reference line 28, a portrait proportionality scale line 30 with head skull 30 and numbered skull division marks 33 and a proportionality scale line 32 with equal, proportionality division marks 34. All lines intersect at center point 12 and terminate at the outline box 36. Horizontal reference line 26, and vertical reference line 28 divide outline box 36 into four quadrants. Portrait proportionality scale line 30 and proportionality scale line 32, besides aiding in proportionality, also act to help the artist determine thrust. The numbers on portrait proportionality scale line 30 simplifies making the head count.

FIGS. 4-7 show the various sizes and location of the secondary 38, tertiary 40, quaternary 42 and quinary 44 grids that have been provided on the artist's grid viewing device 2. The secondary grid 38 is ½ of the size of the primary grid; the tertiary 40 grid is ¼ of the size of the primary grid; the quaternary grid 42 is ⅛ the size of the primary grid; and the quinary grid 44 is 1/16 the size of the primary grid. There is an overlap, or an overlay of grid lines, between the various sized scales. It is to be noted that any one of these scales may be used to properly frame the subject matter. It's selection is based on the viewing distance between the artist 8 and the device 2, which the artist 8 chooses to select to use.

The use of the artist's grid viewing device 2 is best illustrated with reference to FIGS. 2 and 8-12. The sequence of steps to be followed in using the artist's grid viewing device 2 is only a recommendation as individual artists may prefer to follow any sequential grouping of these steps. In the first step, the artist 8 positions the device 2 for viewing within their arm's length such that the subject matter 10 to become the work of art is framed within the square bounded by the outline box 36. With the subject 10 still framed, the artist then manipulates the device 2 until the visual level device 6 indicates that the device 2 and thus horizontal reference line 26, is horizontally level. The artist now knows what horizontal fidelity for this specific artwork looks like. (Reference FIG. 8)

Although described as enabling the artist 8 to correctly visualize and frame the subject 10 with respect to the horizontal plane (horizontal fidelity), the device 2 can be used to establish vertical fidelity in situations where the subject matter 10 resides normal to the horizontal through the use of the vertical reference line 28. Such would be the case for lamp posts, buildings or the like.

Then the artist 8 scales the subject 10 to the outline box 36 by readjusting the device 2 until the subject 10 is the size the artist 8 wants it to be in relation to the size of the working surface (canvas, paper etc.) This shows the artist the size or scale of what the subject matter should look like when placed on the working surface. The vertical reference line 28 and horizontal reference line 26 divide the device 2 into quarters to allow the artist 8 to better frame the subject 10. (See FIG. 9)

Now using portrait proportionality scale line 30 (in the case of a portrait) the artist proportions the overall length of the subject 10 with reference to the head of the person. The device is minimally adjusted for distance from the artist 8 but predominantly is positioned so that the subject's head aligns generally with the size of the skull 32. (In the earlier step of scaling the artist has already determined how much of the subject matter 10 is to be portrayed on the working surface.) This allows the artist, by reference to skull division marks 33, to determine the proportionality of the other parts of the subject 10 by determining the number of head lengths to the overall extent of the subject 10. This prevents the distortion of the subject's relative proportions by the artist. If the subject matter 10 is not a person, then proportionality line 32 and its division marks 34 are used. (See FIG. 10)

With the subject matter 10 in horizontal fidelity, proper scale and proportion, the artist 8 now locates the subject matter 10 with relation to the center point 12 which resides at the intersection of vertical reference line 28, horizontal reference line 26, portrait proportionality scale line 30 and proportionality line 32. (See FIG. 11)

Lastly, the problem of transposing angular displacement of elements of the subject matter 10 in three dimensions onto a two dimensional media is addressed by the use of the portrait proportionality scale line 30 and proportionality line 32. (See FIG. 12) When viewing the angled elements in relation to these 45 degree angled lines it is easy for the artist visually reference and subdivide the angles (or determine the thrust) to render a close approximation to the subject's angled elements.

Figure 13:
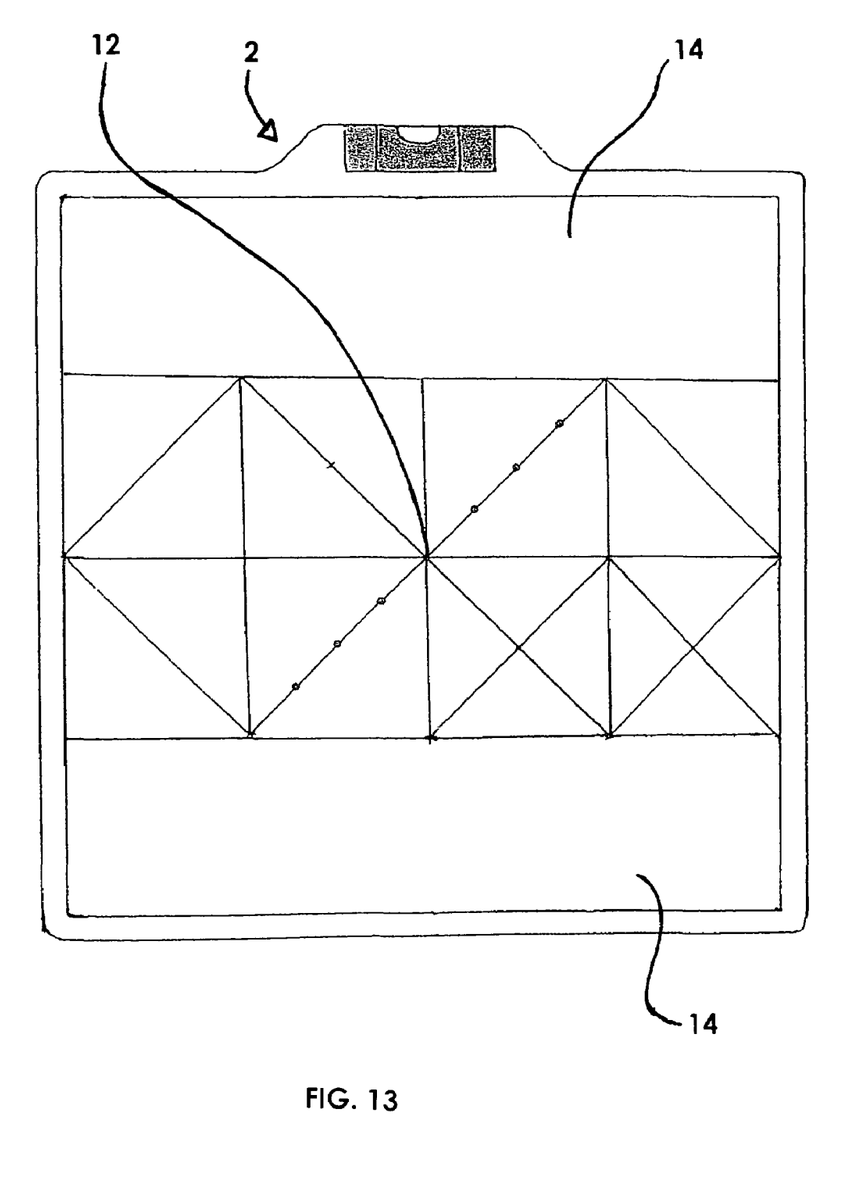
FIG. 13 is a front view of the gridvu masked to approximate the dimensions of a working surface.

Referring to FIG. 13 it is illustrated that by appropriately blocking sections of the artist's grid viewing device 2 with masking tape or another opaque material 14 equally about the center point 12 allows the artist to frame the subject to the working surface's dimensions, if it is other than square, before performing the various sequential steps required to properly frame and prepare to render the artist's interpretation of the subject matter.

It has been shown that many of the lines of the various reference grids are at least partially commonly shared. It is known that the above steps may be performed from different reference grids to arrive at the finished artist's rendition.

The above description will enable any person skilled in the art to make and use this invention. It also sets forth the best modes for carrying out this invention. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. An artist's grid viewing device comprising;
    a rigid, clear frame having a front planar surface, a back planar surface, a top side, a bottom side, a left side and a right side;
    a visual horizontal bubble level; and
    a first linear grid formed by a set of straight lines superimposed onto a planar surface of said grid viewing device;
    wherein said first linear grid has a square outline superimposed on the top planar surface and residing substantially adjacent to a perimeter of said grid viewing device, and a horizontal line dividing said perimeter square into substantially equal areas and having an axis substantially parallel to a longitudinal axis of said level, and further having a mark located at a midpoint of said horizontal line with at least six straight lines radiating from said midpoint to said square outline at 45, 90, 135, 225, 270 and 315 degree angle intervals from said horizontal line; and wherein said left side and said right side are substantially parallel and normal to said bottom side, and wherein said 135 degree angle line has a half skull outline located at its intersection with said square outline, and said 135 degree angle line and said 315 degree angle line have equally spaced incremental markings along their longitudinal axes that substantially correspond to a length of said half skull outline.

2. The artist's grid viewing device of claim 1 wherein said 45 degree angle line and said 225 degree angle line have equally spaced incremental markings along their longitudinal axes.

3. The artist's grid viewing device of claim 2 wherein said first linear grid is superimposed by printing, painting, etching or pin striping said lines onto said front planar surface.

4. The artist's grid viewing device of claim 3 wherein said first grid further comprises;
    straight lines from the intersection of the 90 degree angle line with the square outline and both intersections of the horizontal line and the square outline; and
    straight lines from the intersection of the 270 degree angle line with the square outline and both intersections of the horizontal line and the square outline.

5. The artist's grid viewing device of claim 4 further comprising a second linear grid ¼ the size of said first linear grid yet substantially identical to said first linear grid.

6. The artist's grid viewing device of claim 5 wherein said second linear grid is located in a quadrant of said first linear grid bounded on a left side by said 270 degree angle line and on a top side by said horizontal line.

7. The artist's grid viewing device of claim 6 wherein said clear frame has a thickness in the range of ⅛ to ½ of an inch.

8. The artist's grid viewing device of claim 7 wherein said clear pane has width and height of between 4 and 6 inches.

9. An artist's aid comprising:
    a rigid, clear frame having a front planar surface, a back planar surface, a top side, a bottom side, a left side and a right side, wherein said left side and said right side are substantially parallel and normal to said bottom side;
    a bubble level indicating device adapted for mechanical or adhesive attachment to said top side;
    a first linear rid formed by a set of straight lines and a square outline residing substantially adjacent to a perimeter of said aid that are superimposed onto a planar surface of said aid; and
    a second linear grid formed by a set of straight lines superimposed onto a planar surface of said aid that is ¼ the size of said first linear grid yet substantially identical to said first linear grid;
    wherein said first linear grid has a horizontal line dividing said perimeter square into substantially equal areas and having an axis substantially parallel to a longitudinal axis of said level, and having a mark located at a midpoint of said horizontal line with at least six straight lines radiating from said midpoint to said square outline at 45, 90, 135, 225, 270 and 315 degree angle intervals from said horizontal line, and straight lines from the intersection of the 90 degree angle line with the square outline and both intersections of the horizontal line and square outline, and straight lines from the intersection of the 270 degree angle line with the square outline and both intersections of the horizontal line and square outline, and wherein said 135 degree angle line has a half skull outline located at it's intersection with said square outline, and said 135 degree angle line and said 315 degree angle line have equally spaced numbered, incremental markings along their longitudinal axes that substantially correspond to a length of said half skull outline and wherein said 45 degree angle line and said 225 degree angle line have equally spaced incremental markings along their longitudinal axes.

* * * * *